No. 763,151. PATENTED JUNE 21, 1904.
G. D. BURTON.
PROCESS OF ELECTRICALLY EXTRACTING ESSENTIAL OILS.
APPLICATION FILED JUNE 27, 1898.
NO MODEL. 5 SHEETS—SHEET 3.
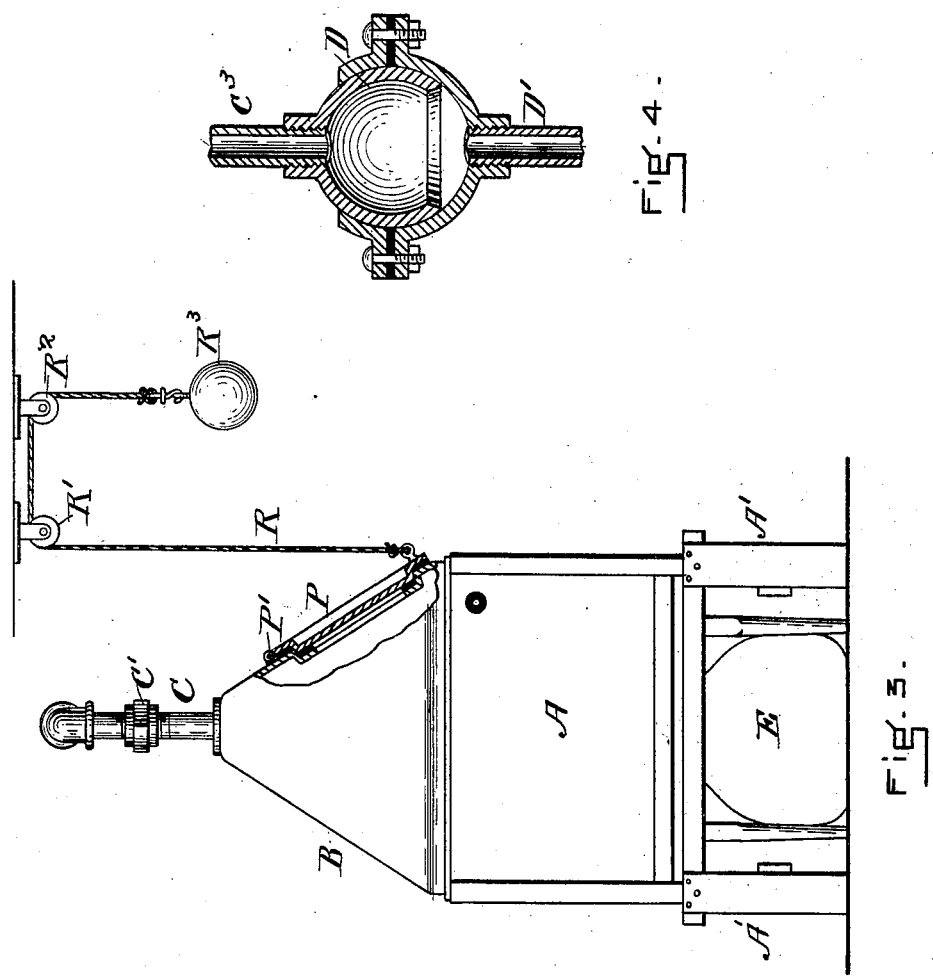

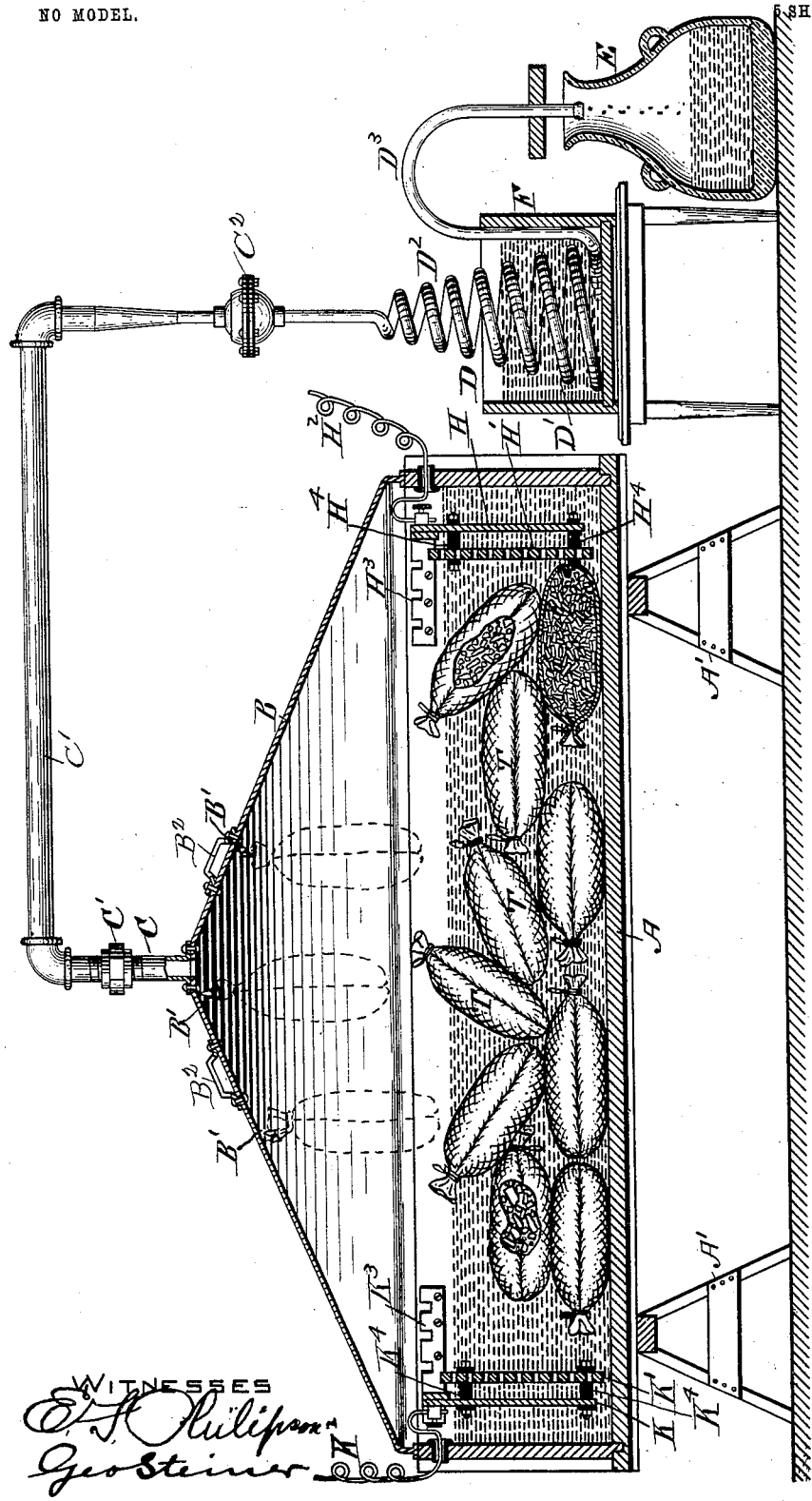

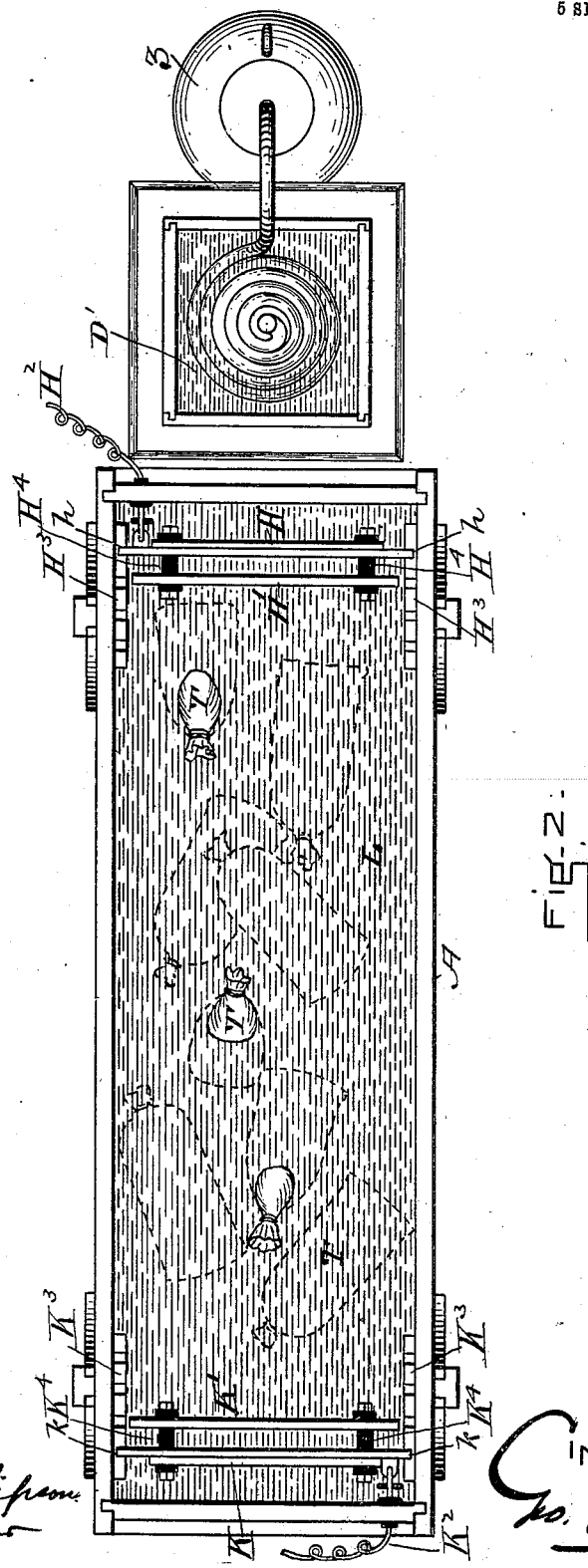

No. 763,151. PATENTED JUNE 21, 1904.
G. D. BURTON.
PROCESS OF ELECTRICALLY EXTRACTING ESSENTIAL OILS.
APPLICATION FILED JUNE 27, 1898.
NO MODEL. 5 SHEETS—SHEET 4.
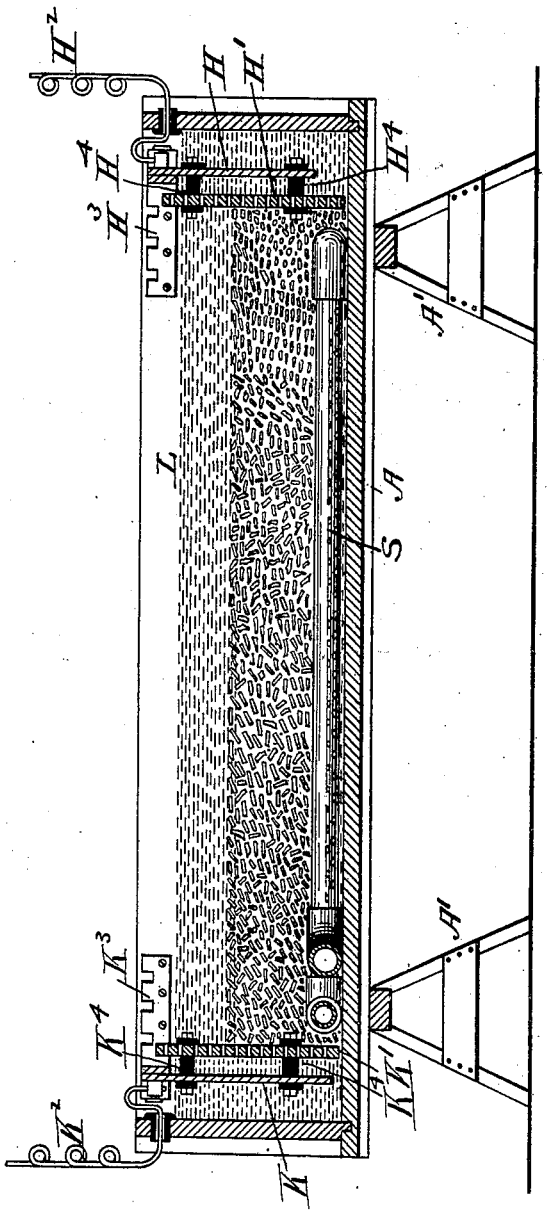

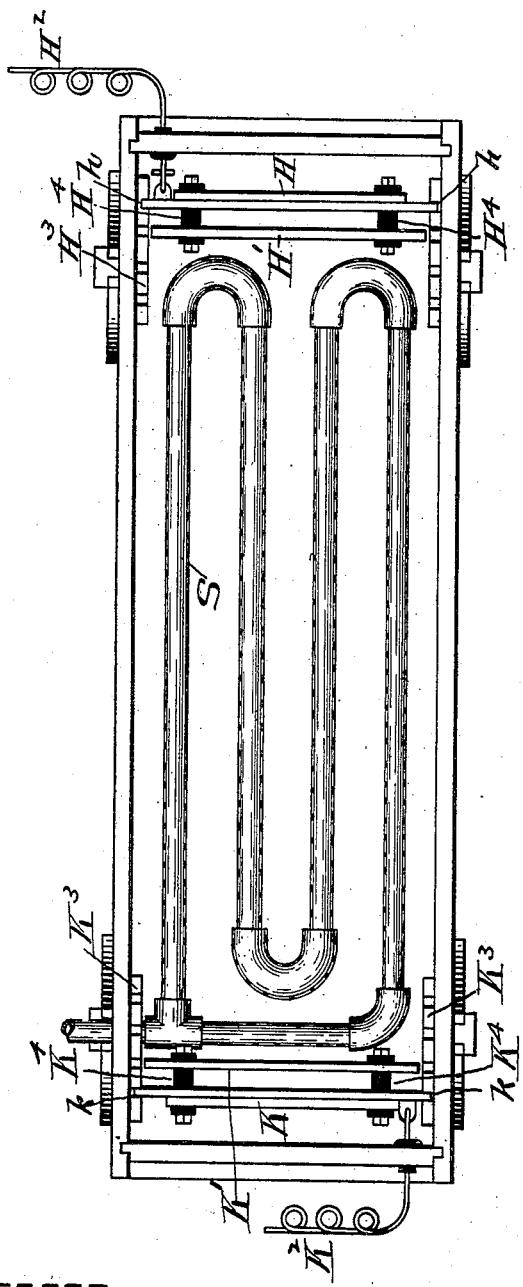

No. 763,151. Patented June 21, 1904.

UNITED STATES PATENT OFFICE.

GEORGE D. BURTON, OF BOSTON, MASSACHUSETTS, ASSIGNOR TO BOSTON LEATHER PROCESS COMPANY, OF PORTLAND, MAINE.

PROCESS OF ELECTRICALLY EXTRACTING ESSENTIAL OIL.

SPECIFICATION forming part of Letters Patent No. 763,151, dated June 21, 1904.

Application filed June 27, 1898. Serial No. 684,595. (No specimens.)

*To all whom it may concern:*

Be it known that I, GEORGE D. BURTON, a citizen of the United States of America, residing in Boston, in the county of Suffolk and State of Massachusetts, have invented certain new and useful Improvements in Processes of Electrically Extracting Essential Oils, of which the following is a specification.

This invention relates to the art of obtaining essential oils from bark or other vegetable matter.

The object of the invention is to facilitate and hasten the operation.

The invention consists principally in immersing the vegetable matter containing the essential oils to be extracted in a suitable menstruum and passing through said menstruum an electric current which heats the liquid and causes a rapid extraction of such oils. The material is preferably placed in porous bags before immersion in the menstruum, and the vapors arising during the operation are preferably condensed.

The accompanying drawings represent a convenient apparatus for carrying out this process.

Figure 1 thereof represents a longitudinal vertical section of such apparatus, in which the material to be treated is placed in porous bags. Fig. 2 represents a top plan view thereof omitting the cover of the main tank. Fig. 3 represents an end elevation of the apparatus with a portion of the cover broken out. Fig. 4 represents a vertical section of a tubular universal joint in the pipe connecting the extracting-tank with the condenser. Fig. 5 represents a longitudinal section of the extracting-tank provided with a perforated pipe through which air or steam may be supplied to the tank and in which the material is disposed loosely in the tank instead of being inclosed in bags. Fig. 6 represents a plan view of the tank shown in Fig. 5.

The same reference characters indicate corresponding parts in the different figures.

The process may be carried out by any suitable apparatus. The apparatus herein shown comprises an extracting-tank A, provided with suitable supporters A', and with a cover or hood B, a condenser D, a pipe connecting the condenser with the tank, a receptacle E, and a pipe $D^3$, connecting said receptacle with the condenser.

The extracting-tank A may be of any suitable form and is preferably constructed of wood or other insulating material. This tank is provided near one end on opposite sides with notched supporting-bars $H^3$, and near its opposite end on opposite sides with similar notched supporting-bars $K^3$. An electrode H, preferably in the form of a transverse plate provided with projections $h$ at its top, is suspended by means of said projections near one end of the tank in the notched supporting-bars $H^3$, the notches rendering the electrode adjustable at a greater or less distance from the end of the tank. A perforated guard-plate H' is supported by means of insulating connections $H^4$ on the inner side of the electrode H and serves to prevent the material in the tank from coming into contact with said electrode. A conductor $H^2$ is connected with said electrode H and passes out through the end wall of the tank and is connected to one pole of a suitable electric source. A similar electrode K, also preferably in the form of a transverse plate provided with projections $k$ (see Figs. 2 and 6) at its top, is suspended by means of said projections from the supporting-bars $K^3$ and is adjustable toward and from the opposite end of the tank. A guard-plate K', preferably perforated, is attached by insulating connections $K^4$ to the electrode K on the inner side thereof. A conductor $K^2$ is connected with electrode K, passing out through the opposite end of the tank, and is connected to the opposite pole of the electric source.

The cover B is preferably provided on its interior with supension-hooks B' and on its exterior with handles $B^2$. It is also provided with an opening having a door P, hinged at P'. This door is balanced by weight $R^3$, connected thereto by a cord R, which passes over pulleys R' and $R^2$, as shown in Fig. 3. The condenser comprises a small tank D' for containing a cooling liquid and a worm $D^2$, coiled in said tank. The connecting-pipe C is provided in its upright portion leading out from the tank with an adjustable joint C' and in its downward portion leading to the condenser with a hollow universal joint C², which admits of free adjustment of the parts.

In carrying out the process by means of this apparatus the material from which the essential oil is to be extracted—such, for instance, as tanbark—is placed in porous bags T and disposed in the tank in a suitable menstruum therein. This menstruum may consist of water or any suitable aqueous solution which permits the passage of the electric current. Then a current of electricity of a required power for heating the liquid and extracting the matter contained in the substance under treatment is turned on. The current varies according to the size of the tank used, ranging from four to five hundred volts and from one to one hundred and fifty amperes. As the liquid and its contents become heated the current increases unless cut off by interposed resistance and the process of maceration and digestion progresses and the menstruum becomes more rich in extractive matter until the substance under treatment becomes exhausted, or substantially so. The heated menstruum gives off vapors consisting mainly of the volatile portion of the essential oil mixed with aqueous vapor which pass over through the pipe C when in excess into the condenser D, where they are condensed, and thence pass to the receptacle E. For convenience in draining the material contained in the bags after the extracting operation the bags may be suspended upon hooks B' in the cover or dome B, as indicated by dotted lines in Fig. 1.

In Figs. 5 and 6 the extracting-tank is provided at its bottom with a coil of perforated pipes S, the perforations being shown as on the under side of the coil of pipes. These perforations may supply air or steam under pressure and constitute an agitator for the loose material within the tank. In carrying out the process by means of this form of apparatus the electric current is passed through the menstruum in a manner hereinbefore described and operates to heat it and the vegetable matter immersed therein until the essential oil is steeped out or extracted therefrom. The air or steam supplied through the perforated pipe prevents any permanent lodgment of the bark or other material on the bottom of the tank and keeps the material in a continued state of agitation, thereby exposing it more effectually to the steeping operation.

I claim as my invention—

1. The process of obtaining essential oil from bark or other vegetable matter, which consists in immersing the vegetable matter containing the oil to be extracted in a suitable menstruum, and passing through said menstruum an electric heating-current of such a voltage and amperage as will raise the menstruum to a temperature sufficient to extract the essential oil.

2. The process of obtaining essential oil from bark or other vegetable matter, which consists in immersing the vegetable matter containing the oil to be extracted in a suitable menstruum, passing through said menstruum an electric heating-current of such a voltage and amperage as will raise said menstruum to a temperature sufficient to extract the essential oil, and condensing the vapors arising from the operation.

In testimony whereof I have signed my name to this specification, in the presence of two subscribing witnesses, on this 24th day of June, A. D. 1898.

GEO. D. BURTON.

Witnesses:
　ALBERT W. MANN,
　FRANK G. PARKER.